United States Patent
Mukae et al.

(10) Patent No.: US 6,750,425 B2
(45) Date of Patent: Jun. 15, 2004

(54) THREE-DIMENSIONAL LASER BEAM MACHINE

(75) Inventors: Tomonari Mukae, Tokyo (JP); Masaki Tsukamoto, Tokyo (JP); Hidekazu Sawai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/343,452

(22) PCT Filed: Mar. 20, 2002

(86) PCT No.: PCT/JP02/02686
§ 371 (c)(1),
(2), (4) Date: Jan. 31, 2003

(87) PCT Pub. No.: WO03/031110
PCT Pub. Date: Apr. 17, 2003

(65) Prior Publication Data
US 2003/0173340 A1 Sep. 18, 2003

(30) Foreign Application Priority Data
Sep. 28, 2001 (JP) ............................... 2001-300838

(51) Int. Cl.[7] .............................................. B23K 26/02
(52) U.S. Cl. ............................ 219/121.78; 219/121.83
(58) Field of Search ......................... 219/121.78, 121.83, 219/121.81, 121.6

(56) References Cited

U.S. PATENT DOCUMENTS

| 4,687,901 A | * | 8/1987 | Binder et al. .......... 219/121.67 |
| 4,694,139 A | * | 9/1987 | Roder .................... 219/121.78 |
| 6,452,131 B2 | * | 9/2002 | Britnell ................... 219/121.6 |

FOREIGN PATENT DOCUMENTS

| EP | 509103 | 10/1992 |
| JP | 61-199593 | 9/1986 |
| JP | 2-112891 | 4/1990 |
| JP | 2-108105 | 8/1990 |
| JP | 8-300171 | 11/1996 |
| JP | 2000-326082 | 11/2000 |

* cited by examiner

*Primary Examiner*—M. Alexandra Elve
(74) *Attorney, Agent, or Firm*—Sughrue Mion, PLLC

(57) ABSTRACT

In a three-dimensional laser beam machine having a head structure in which a processing point is not moved when a rotation axis and an attitude axis are rotated, the machine has: means for storing information of current angles of the rotation axis and the attitude axis, and calculating a nozzle direction vector from the angles; means for, based on the nozzle direction vector, determining angles of a nozzle in a vertical direction and a horizontal direction consisting of a Z-axis of an orthogonal coordinate system; and means for displaying the determined nozzle angles.

6 Claims, 14 Drawing Sheets

| MACHINE COORDINATES | | NOZZLE ANGLES | |
|---|---|---|---|
| X | 10.000 | HORIZONTAL | 30.000 # |
| Y | 20.000 | VERTICAL | 45.000 # |
| Z | 30.000 | | |
| W | 75.000 | | |
| U | 65.000 | | |

COORDINATE DISPLAYING SECTION

COORDINATE DISPLAYING SECTION

| MACHINE COORDINATES | |
|---|---|
| X | 10.000 |
| Y | 20.000 |
| Z | 30.000 |
| W | 75.000 |
| U | 65.000 |

THREE-DIMENSIONAL LASER BEAM MACHINE

TECHNICAL FIELD

The present invention relates to a control apparatus for a three-dimensional laser beam machine having a head structure in which the processing point is not moved when the rotation axis and the attitude axis are rotated, the control apparatus having a function of, based on a nozzle direction vector, displaying an angle of a nozzle in a vertical direction consisting of the Z-axis of an orthogonal coordinate system, and an angle in a horizontal direction when the nozzle direction vector is projected to the XY-plane.

BACKGROUND ART

Hereinafter, the configuration of a three-dimensional laser beam machine that machines a planar or three-dimensional workpiece shape, and that has a structure of a head in which the processing point is not moved when the rotation axis and the attitude axis are rotated (hereinafter, such a head is referred to as unidirectional head) will be described with reference to FIGS. 6, 7, and 8.

FIG. 6 is a perspective view showing the configurations of axes of a three-dimensional laser beam machine on which a unidirectional head is mounted, FIGS. 7A and 7B are enlarged views of a processing head of the three-dimensional laser beam machine on which a unidirectional head is mounted, and FIG. 8 is a block diagram showing the configuration of the three-dimensional laser beam machine.

In the figures, 109 denotes an attitude axis (hereinafter, referred to as U-axis) which is positioned at the drive end of an arm 111, 110 denotes a rotation shaft (hereinafter, referred to as W-axis) which is connected to the U-axis 109, and 108 denotes a Z-axis which is connected to the W-axis 110. These axes constitute the arm 111.

The processing head 3 has: the W-axis 110 which is placed at the tip end of a Z-axis bearing 115, and which can be rotated in a direction of an arrow +α or −α about the Z-axis by a rotary bearing 114; and the U-axis 109 which is attached to the tip end of the W-axis 110 by an attitude bearing 113, and which can be rotated in a direction of an arrow +β or −β about an axis that is inclined by 45 degrees with respect to the Z-axis. A processing nozzle 4 is attached to the tip end of the U-axis 109. Since the U-axis 109 is rotated about the axis which is inclined by 45 degrees with respect to the horizontal plane, the angle of the U-axis does not correspond in a one-to-one relationship to the vertical angle at which the processing nozzle 4 is directed.

The reference numeral 113 denotes the attitude bearing which rotates the U-axis 109 by a servo motor SM5 in the direction of the arrow +β or −β, and 114 denotes the rotary bearing which rotates the W-axis 110 by a servo motor SM4 in the direction of the arrow +α or −α.

The reference numeral 115 denotes the Z-axis bearing which moves the processing head 3 by a servo motor SM3 in the direction of an arrow Z, 116 denotes a Y-axis bearing which moves the processing head 3 by a servo motor SM2 in the direction of an arrow Y, and 117 denotes an X-axis bearing which moves a processing table 2 by a servo motor SM1 in the direction of an arrow X. The servo motors SM1 to SM5 are driven by a driving signal from an NC controller 8. The reference letter P denotes a processing point the position of which is not moved even when the W-axis 110 and the U-axis 109 are rotated.

The reference numeral 105 denotes a laser oscillator which generates a laser beam, and 103 denotes an operation section through which the NC controller is operated.

When laser beam processing is to be conducted by using the thus configured laser beam machine, it is requested in laser beam processing which machines a planar or three-dimensional workpiece shape that the direction and posture of the processing nozzle 4 are always perpendicular to the processing plane in order to maintain the optical axis of the laser beam irradiating the processing plane to be normal to the processing plane. Before conducting processing, therefore, the operator makes the processing point P coincident with a point (hereinafter, referred to as teaching point) on a processing line K of a processing workpiece 9, and in advance of actual processing conducts a teaching work in which a teaching point satisfying the requirement is input as a teaching data into a program.

During laser beam processing, in accordance with the teaching data, the spot of the laser beam is controlled so as to advance along the processing line K while maintaining the distance of the processing head 3 with respect to the processing workpiece 9 to be constant.

FIG. 9 is a view showing angles of horizontal and vertical components of a unit vector (hereinafter, referred to as nozzle direction vector) in a direction indicated by the processing nozzle 4 from the angles of the W-axis 110 and the U-axis 109, in a coordinate system (hereinafter, referred to as orthogonal coordinate system) in which the XY plane is defined as a horizontal plane and X-, Y-, and Z-axes are outer products of the other axes or relationships of Y×Z, Z×X, and X×Y are established. The reference numeral 70 denotes a teaching point in an inclined portion of a workpiece, and 71 denotes a line segment formed by the origin O and the teaching point 70, i.e., the nozzle direction vector.

The reference numeral 72 denotes a point which is obtained by projecting the teaching point 70 onto the XY-plane, 73 denotes a line segment which is obtained by projecting the line segment 71 onto the XY-plane, i.e., a line segment which is formed by the origin O and the point 72, 74 denotes the X component dx at the processing point 70, 75 denotes the Y component dy at the processing point 70, 76 denotes the Z component dz at the processing point 70, θ denotes an angle θ of the vertical component formed by the line segment 71 and the Z-axis, and φ denotes an angle φ of the horizontal component formed by the line segment 73 and the X-axis. In FIG. 9, because of the structure of the processing head 3, it is known that the nozzle direction vector d is given from the angle α of the W-axis 110 and the angle β of the U-axis 109 as:

$$d = \begin{pmatrix} dx \\ dy \\ dz \end{pmatrix} = \begin{pmatrix} \frac{1}{2}\cdot\cos\alpha - \frac{1}{2}\cdot\cos\alpha\cdot\cos\beta + \frac{\sqrt{2}}{2}\cdot\sin\alpha\cdot\sin\beta \\ -\frac{1}{2}\cdot\sin\alpha + \frac{1}{2}\cdot\sin\alpha\cdot\cos\beta + \frac{\sqrt{2}}{2}\cdot\cos\alpha\cdot\sin\beta \\ \frac{1}{2} + \frac{1}{2}\cdot\cos\beta \end{pmatrix}$$

When a polar coordinate system is used, the relationships between the components dx, dy, and dz at the teaching point 70 in FIG. 9 and the angles of the horizontal component and the vertical component are obtained by the following expressions:

$\cos\theta = dz$ $\tan\phi = dy/dx$

From the expressions, the angles in the horizontal and vertical directions are obtained.

$\theta = a \cos(dz)$ $\phi = a \tan(dy/dx)$

As described above, the conversion expressions contain an inverse trigonometric function. In the case where only the angle β of the U-axis 109 is known, it is impossible to read the angle θ of the vertical component by which the processing nozzle 4 is directed.

The above is similarly applicable to the relationship between the W-axis 110 and the angle φ of the horizontal component.

FIGS. 10A and 10B are views showing an attitude change of the processing head in a teaching process, and processing in which the incident angle of the laser beam is inclined, FIG. 10A shows an attitude change of the processing head in a teaching process and in an attitude change corner portion in a three-dimensional laser beam machine having a head structure in which the processing point is not moved when the W-axis and the U-axis are rotated, and FIG. 10B is a view showing processing (hereinafter, referred to as taper processing) in which the incident angle of the laser beam is inclined with respect to the surface of the workpiece.

In the figure, P1 denotes a teaching point which is on the processing line K of the processing workpiece 9 and on a horizontal plane, P2 denotes a teaching point which is on the processing line K of the processing workpiece 9 and on a 45-degree inclined plane, P3 denotes a teaching point which is on the processing line K of the processing workpiece 9 and on an uprighting plane, 3a and 4a denote a processing head and a processing nozzle which are downward directed at the teaching point P1, 3b and 4b denote a processing head and a processing nozzle which are directed to 45 degrees at the teaching point P2, and 3c and 4c denote a processing head and a processing nozzle which are horizontally directed at the teaching point P3.

When teaching is to be conducted, the operator reads the shape of a completed workpiece from a predetermined drawing for conducting laser beam processing. Based on the shape, the operator then scribes the processing line K on a workpiece for producing teaching data, and determines the nozzle angle at each of the teaching points on the processing line K. When a perpendicular state is to be then established at each of the teaching points P1, P2, and P3 on the processing workpiece 9, the nozzle angles are adjusted to 0°, 45°, and 90° which are workpiece inclination angles determined from the drawing.

In FIG. 10B, A denotes a designated angle in the taper processing, and the nozzle angles are requested to be adjusted to this value.

The operator cannot calculate correct values of the W- and U-axes from the nozzle angles which are determined from the drawing. Therefore, it is difficult to attain numerical coincidence, and approximate values only can be estimated at the best.

FIG. 11 is a view showing a conventional coordinate display screen that displays coordinates of axes in a machine coordinate system in which a characteristic position defined by a machine is used as the origin. The screen is displayed during a teaching work.

In the screen, the position (hereinafter, referred to as tip end position) of the processing point P which is at the tip end of the processing nozzle 4 on the X-, Y-, and Z-axes is shown with respect to the machine origin peculiar to the machine, and the attitude of the processing nozzle 4 is indicated by means of the angles α and β of the W- and U-axes.

When the X-, Y-, Z-, W-, and U-axes are further moved, the values of the axes on the screen are updated on occasion in accordance with the movement.

Since a teaching data is produced by using the coordinates, the values of the W- and U-axes are necessary in processing to control the spot of the laser beam to advance along the processing line K by means of processing in the NC.

However, there are few situations where such values are handled as information to be indicated to the operator.

FIG. 12 shows a flowchart of a conventional teaching work in an inclined portion of a workpiece or taper processing.

As preparations for a teaching work in which a three-dimensional program is prepared by teaching of processing points, various items such as effectiveness of the use of a teaching box (hereinafter, abbreviated to T/B) 7 are set, and commands such as shutter opening of auxiliary function codes which are default settings in a processing program are set in step ST11.

While seeing the coordinates of the X-, Y-, and Z-axes on the coordinate display screen shown in FIG. 11, thereafter, the tip end position is moved in step ST12 to a teaching point by using a processing shaft feed key disposed on the T/B 7, or a handle and a joy stick.

At this time, if the angles of the processing nozzle 4 must be adjusted by teaching in an inclined portion of a workpiece or taper processing (step ST13), the W-axis 110 and the U-axis 109 are manually rotated in step ST14 in order to set the attitude of the processing nozzle 4.

In step ST15, step ST14 is repeated until it is affirmed as a result of checking of the nozzle angles by visual inspection that the perpendicular state is realized or the angles in the taper processing are attained.

After the setting of the tip end position and the attitude at the teaching point is ended in step ST15, teaching is conducted as teaching data in step ST16.

Subsequently to the above, while seeing the coordinate display shown in FIG. 11, the tip end position is similarly moved to the next teaching point by using the processing shaft feed key disposed on the T/B 7, or the handle and the joy stick, and teaching points of the processing program are produced by the teaching work.

In the case of a teaching work in which the angles of the processing nozzle 4 are not adjusted in step ST13, the works of steps ST14 and ST15 are omitted.

Finally, commands such as shutter closing and program end of auxiliary function codes are input in step ST18, and the preparation of the processing program is ended.

In a teaching work in a three-dimensional laser beam machine having the head structure of FIGS. 7A and 7B, conventionally, the method of the flowchart shown in FIG. 12 is established as a standard operation.

Because of visual checking, however, the accuracy of the adjustment of the nozzle angles in the perpendicular state and the taper processing is so poor that satisfactory processing is hardly realized. Moreover, the teaching work requires a long time period.

In the work of checking the position and attitude of each teaching point immediately before processing, when the angles of the W-axis 110 and the U-axis 109 are to be changed, it is necessary to readjust the attitude at the teaching point, and the attitude is corrected on the basis of the operations of steps ST13 to ST16 of the above-mentioned flowchart.

For the purpose of reference, the configuration of a three-dimensional laser beam machine having a structure of another kind of head type (hereinafter, referred to as offset type head) which is provided with a slim processing head, and which is suitable for processing of a deep drawing workpiece will be described with reference to FIGS. 13 and 14.

FIG. 13 is a perspective view showing the configurations of axes of a three-dimensional laser beam machine on which an offset type head is mounted, and FIGS. 14A and 14B are enlarged views of a processing head of the three-dimensional laser beam machine on which an offset type head is mounted. The components denoted by the same reference numerals as those of the three-dimensional laser beam machine on which the unidirectional head shown in FIGS. 7A and 7B is mounted are structured in a substantially same manner, and the portion of the arm 111 is differently configured.

Referring to the figures, the processing head 4 has: a rotation axis (hereinafter, referred to as C-axis) 122 which is placed at the tip end of the Z-axis member 115, and which can be rotated in a direction of an arrow +α' or −α' about the Z-axis by the rotary bearing 114; and an attitude axis (hereinafter, referred to as A-axis) 121 which is attached to the tip end of the C-axis 122 by the attitude bearing 113, and which can be rotated in a direction of an arrow +β' or −α' about an axis (the C-axis 122) that is perpendicular to the Z-axis. The processing nozzle 4 is attached to the tip end of the A-axis 121.

The angle of the A-axis 121 corresponds in a one-to-one relationship to the vertical angle of the processing nozzle 4, and that of the C-axis 122 corresponds in a one-to-one relationship to the horizontal angle of the processing nozzle 4.

Next, also with respect to the offset type head, relationships between the angles of the rotation axis and the attitude axis, and the angles of the horizontal component and the vertical component of the nozzle direction vector are shown.

In FIG. 14B, because of the structure of the processing head 3, it is known that the nozzle direction vector d' is given from the angle α' of the C-axis 122 and the angle β' of the A-axis 121 as:

$$d' = \begin{pmatrix} dx \\ dy \\ dz \end{pmatrix} = \begin{pmatrix} \sin\alpha' \cdot \sin\beta' \\ \cos\alpha' \cdot \sin\beta' \\ \cos\beta' \end{pmatrix}$$

When a polar coordinate system is used, the relationships between the components dx, dy, and dz at the teaching point 70 in FIG. 9 and the angles of the horizontal component and the vertical component are obtained by the following expressions:

$$\cos\theta = dz$$

$$\tan\phi = dy/dx$$

From the expressions, the angles of the horizontal component and the vertical component are obtained.

$$\theta = \beta'$$

$$\phi = 90° - \alpha'$$

Even when only the angle β' of the A-axis 121 is known, it is possible to read the angle θ of the vertical component by which the processing nozzle 4 is directed.

The above is similarly applicable to the relationship between the C-axis 122 and the angle φ of the horizontal component.

FIG. 15 shows a flowchart of a teaching work in the three-dimensional laser beam machine having an offset type head.

Referring to the figure, operations of the steps up to step ST22 are identical with those of the steps up to step ST12 of the unidirectional head shown in FIG. 12. Thereafter, in the case where the angles of the processing nozzle 4 are required to be adjusted (step ST23), a tip end fixing mode in which tip end position is fixed and the C-axis 122 and the A-axis 121 are rotated to match the attitude is set in step ST24.

While seeing the display of the angles the C-axis 122 and the A-axis 121 on the coordinate display screen, the C-axis 122 and the A-axis 121 are rotated in step ST25 until a perpendicular state is attained in a known inclined portion of a workpiece such as shown in FIG. 14A, or the processing nozzle 4 is set to the angle for the taper processing.

After the setting of the tip end position and the attitude at the teaching point is ended, teaching is conducted as teaching data in step ST26.

Operations of subsequent steps ST27 and ST28 are identical with those of steps ST17 and ST18 of the unidirectional head shown in FIG. 12.

In the teaching work in the three-dimensional laser beam machine having the conventional head structure shown in FIG. 13, the shape of a completed workpiece is read from a drawing and the nozzle angles are then determined as shown in the above-mentioned flowchart. Since the nozzle angles correspond in a one-to-one relationship to the C-axis and the A-axis, adjustment to a perpendicular state and the angle designated in the drawing can be conducted easily and accurately on the known inclined portion of the workpiece, so that also the time period of the teaching work can be shortened.

As shown in the flowchart of FIG. 15, the teaching work in a three-dimensional laser beam machine having the conventional offset type head structure is easily conducted. However, the teaching work in an inclined portion of a workpiece or taper processing using a three-dimensional laser beam machine having the unidirectional head structure has a problem in that the accuracy of the nozzle angle at a teaching point in an inclined portion of a workpiece or taper processing is low because the W-axis and the U-axis are manually rotated until the perpendicular state is realized or the angle in the taper processing is attained, while the operator visually checks the nozzle angles in teaching, and also a further problem in that, as the number of teaching points is more increased, teaching requires a longer time period because teaching is conducted on each of teaching points.

In the teaching work in a three-dimensional laser beam machine having a head structure in which the processing point is not moved when the W-axis and the U-axis are rotated, the actual angles of the processing nozzle in the horizontal and vertical directions cannot be known from the angles of the W-axis and the U-axis as described in the prior art paragraph. For the user who previously had a three-dimensional laser beam machine on which an offset type head is mounted, therefore, such a teaching work is poor in easiness of the nozzle angle adjustment and low in working efficiency as compared with that in the case of an offset type head.

DISCLOSURE OF THE INVENTION

The invention has been conducted in order to solve the problems. It is an object of the invention to improve the efficiency of a teaching work in a three-dimensional laser beam machine having a head structure in which the processing point is not moved when the W-axis and the U-axis are rotated, by calculating and displaying the angles of a nozzle in the horizontal and vertical directions in an orthogonal coordinate system.

It is another object of the invention to provide a control apparatus for a three-dimensional laser beam machine which can easily establish a perpendicular state for a processing workpiece in which the inclination angle is known.

In order to attain the objects, according to a first aspect, in a three-dimensional laser beam machine having a head structure in which a processing point is not moved when a rotation axis and an attitude axis are rotated, the machine comprises: means for storing information of current angles of the rotation axis and the attitude axis, and calculating a nozzle direction vector from the angles; means for, based on the nozzle direction vector, determining angles of a nozzle in a vertical direction and a horizontal direction consisting of a Z-axis of an orthogonal coordinate system; and means for displaying the determined nozzle angles.

Furthermore, determination of the angles of the nozzle in the vertical direction and the horizontal direction is obtained on the basis of the nozzle direction vector from the angle of the nozzle in the vertical direction consisting of the Z-axis of the orthogonal coordinate system, and an angle in the horizontal direction consisting of an X-axis when the nozzle direction vector is projected onto an XY-plane.

The machine further comprises nozzle angle setting means for previously storing angles of the nozzle, and comprises notifying means for comparing with the determined angles of the nozzle in the vertical direction and the horizontal direction, to notify that the previously stored nozzle angles are attained.

Furthermore, the nozzle angles are displayed on a remote operation section such as a teaching box.

The machine further comprises nozzle angle setting means for previously storing angles of the nozzle, and compares with the determined angles of the nozzle in the vertical direction and the horizontal direction, whereby the rotation axis and the attitude axis of the nozzle are rotated and the nozzle is positioned to the previously stored nozzle angles.

BEST MODE FOR CARRYING OUT THE INVENTION

Embodiment 1.

Figure 1:
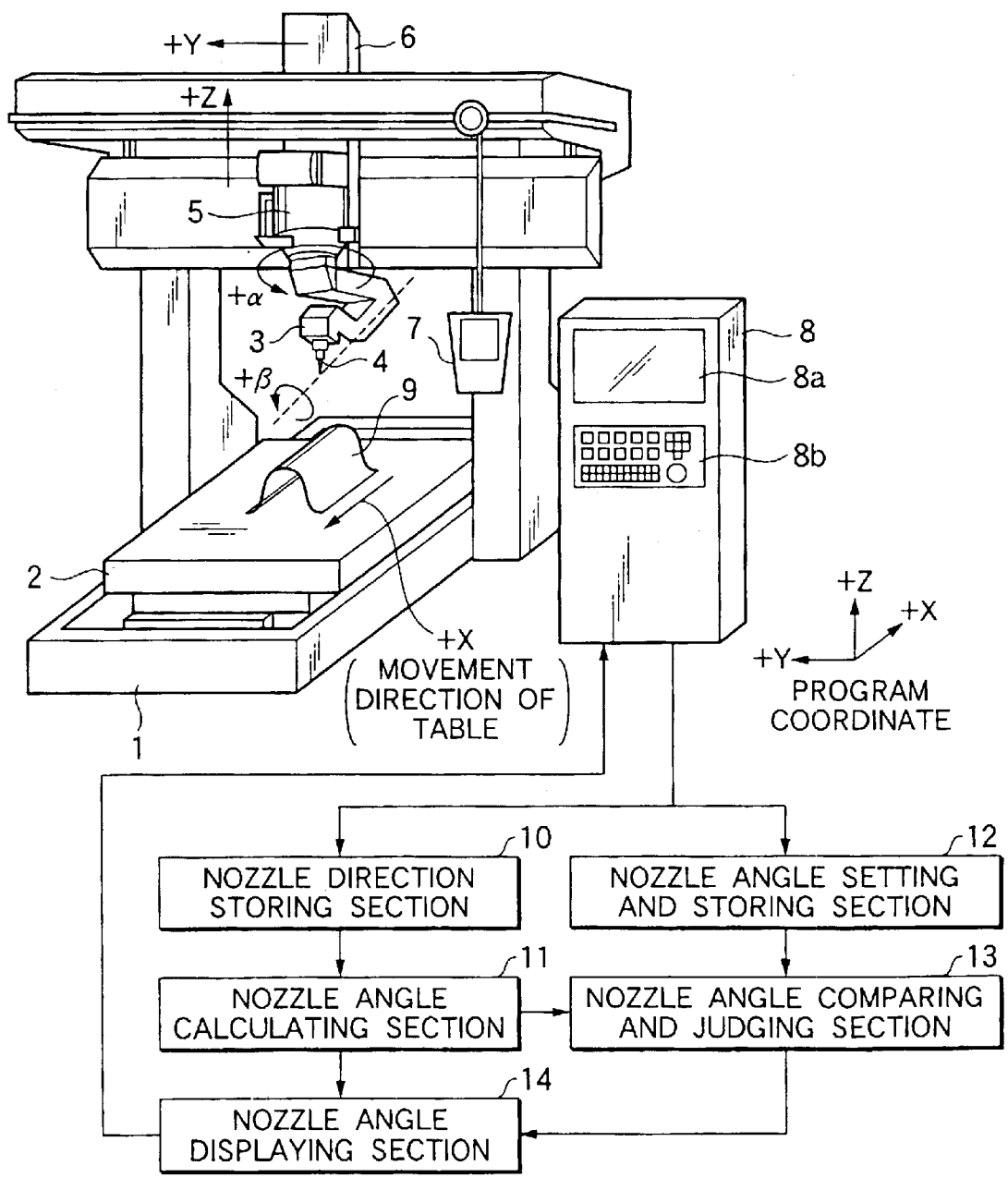
FIG. 1 is a whole configuration diagram showing functions of the three-dimensional laser beam machine of the invention, and the flow of the process.

FIG. 1 is a perspective view of a system of a three-dimensional laser beam machine on which a unidirectional head is mounted, in a teaching work.

In the figure, 1 denotes the body of a three-dimensional machine, 2 denotes a processing table which is disposed on a bed so as to be movable in the X-axis direction, 3 denotes a processing head which is attached to a Z-axis unit 5, 4 denotes a processing nozzle which is attached to the tip end of the processing head 3, and 5 denotes the Z-axis unit which can move the processing head 3 in the direction of an arrow Z, and which is disposed on a Y-axis unit 6 so as to be movable in the Z-axis direction.

The reference numeral 6 denotes the Y-axis unit which can move the Z-axis unit 5 in the direction of an arrow Y, and which is movably disposed on a cross rail that is horizontally laid between right and left columns.

The reference numeral 7 denotes a pendant type teaching box, 8 denotes an NC controller which is configured by a computer, and which has a control panel 8a serving as a man-machine interface, and a screen displaying section 8b configured by a CRT, a liquid crystal, or the like, and 9 denotes a processing workpiece which is placed on the processing table 2.

The workpiece table 2, the Z-axis unit 5, and the Y-axis unit 6 are driven by an X-axis servo motor, a Z-axis servo motor, and a Y-axis servo motor which are not shown, respectively, and positionally controlled by axis commands from the NC controller 8. The reference numeral 10 denotes a nozzle direction storing section which calculates and stores a unit vector (hereinafter, referred to as nozzle direction vector) in a direction indicated by the processing nozzle 4 from the current angles of the W-axis 22 and the U-axis 24, 11 denotes a nozzle angle calculating section which, on the basis of the nozzle direction vector calculated by the nozzle direction storing section 10, calculates the angle of the nozzle in the vertical direction consisting of the Z-axis of the orthogonal coordinate system, and the angle in the horizontal direction when the nozzle direction vector is projected onto the XY-plane, 12 denotes a nozzle angle setting and storing section which stores a set value of a nozzle angle which is set on the screen of the screen displaying section 8b or the T/B 7, and which is to be previously moved, 13 denotes a nozzle angle comparing and judging section which judges whether the nozzle angle setting and storing section 12 coincides with a result of the nozzle angle calculating section 11 or not, and which, if the coincidence is attained, turns on an arrival signal, and 14 denotes a nozzle angle displaying section which displays the angles in the horizontal and vertical directions calculated by the nozzle angle calculating section 11, on the T/B 7 and the screen displaying section 8b of the NC controller 8, and which, when the arrival signal of the nozzle angle comparing and judging section 13 is on, displays a mark in the vicinity of the nozzle angle.

The nozzle direction storing section 10, the nozzle angle calculating section 11, the nozzle angle setting and storing section 12, the nozzle angle comparing and judging section 13, and the nozzle angle displaying section 14 are internal processing functions of the NC controller 8.

In the calculation process of the nozzle angle calculating section 11, calculation is implemented by the following logical expression.

Figure 2:
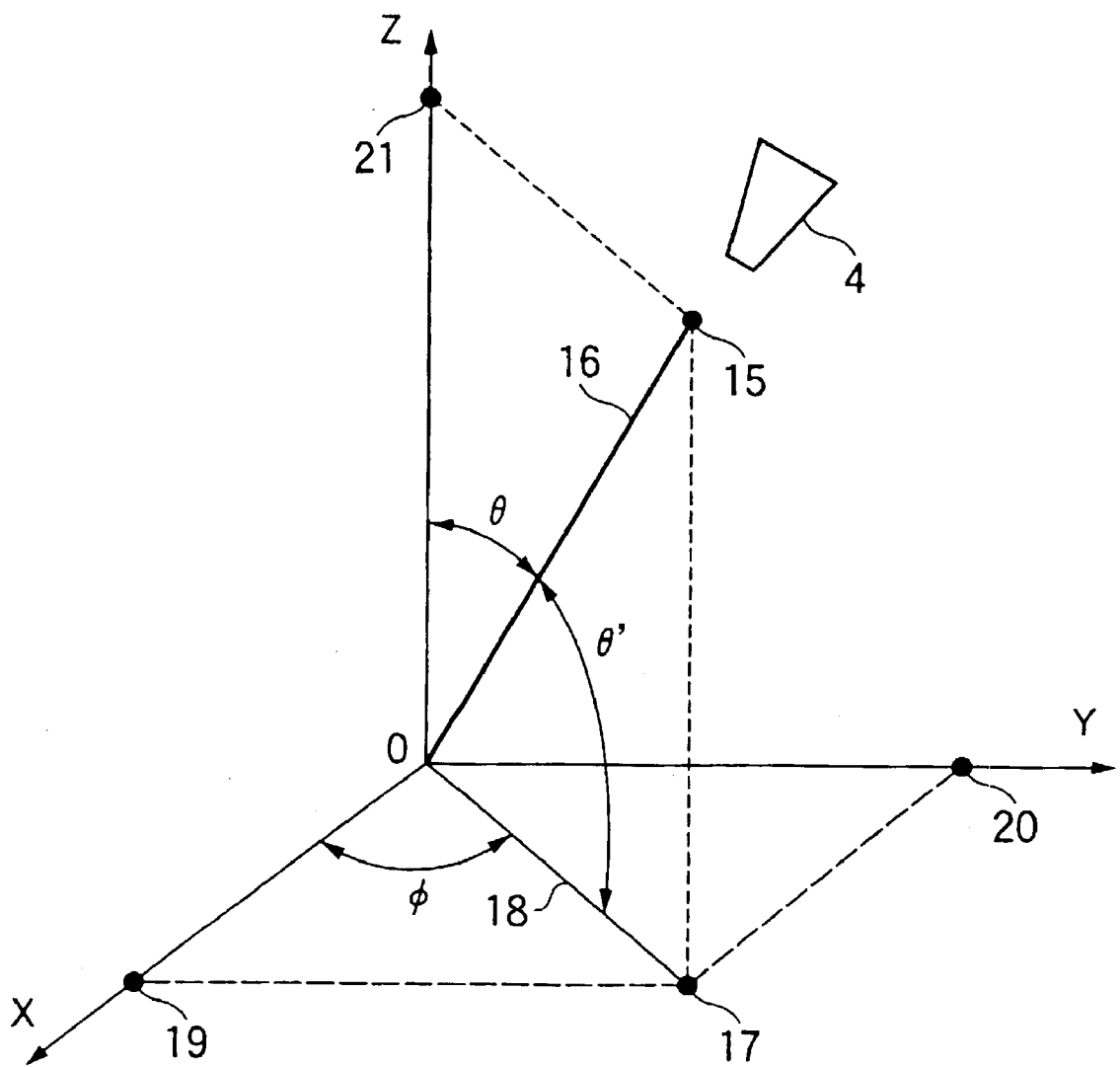
FIG. 2 is a view showing angles of a nozzle in the horizontal and vertical directions as seen from an orthogonal coordinate system.

FIG. 2 is a view showing angles of the nozzle direction vector in the horizontal and vertical directions in a orthogonal coordinate system in which the XY plane is defined as a horizontal plane and X-, Y-, and Z-axes are outer products of the other axes or relationships of Y×Z, Z×X, and X×Y are established.

The reference numeral 15 denotes a teaching point in an inclined portion of a workpiece, 16 denotes a line segment formed by the origin O and the teaching point 15, i.e., the nozzle direction vector, 17 denotes a point which is obtained by projecting the teaching point 15 onto the XY-plane, 18 denotes a line segment which is obtained by projecting the line segment 16 onto the XY-plane, i.e., a line segment formed by the origin and the point 17, 19 denotes the X component dx at the processing point 15, 20 denotes the Y component dy at the processing point 15, 21 denotes the Z component dz at the processing point 15, θ denotes an angle θ of the vertical component formed by the line segment 14 and the Z-axis, and φ denotes an angle φ of the horizontal component formed by the line segment 16 and the X-axis.

In FIG. 2, because of the structure of the processing head 3, it is known that the nozzle direction vector d is given from the angles α and β of the W-axis 22 and the U-axis 24 as:

$$d = \begin{pmatrix} dx \\ dy \\ dz \end{pmatrix} = \begin{pmatrix} \frac{1}{2}\cdot\cos\alpha - \frac{1}{2}\cdot\cos\alpha\cdot\cos\beta + \frac{\sqrt{2}}{2}\cdot\sin\alpha\cdot\sin\beta \\ -\frac{1}{2}\cdot\sin\alpha + \frac{1}{2}\cdot\sin\alpha\cdot\cos\beta + \frac{\sqrt{2}}{2}\cdot\cos\alpha\cdot\sin\beta \\ \frac{1}{2} + \frac{1}{2}\cdot\cos\beta \end{pmatrix}$$

When a polar coordinate system is used, the relationships between the components dx, dy, and dz at the teaching point 15 in FIG. 2 and the angles of the horizontal component and the vertical component are obtained by the following expressions:

$\cos\theta = dz$ $\tan\phi = dy/dx$

From the expressions, the angles in the horizontal and vertical directions are obtained.

$\theta = a\cos(dz)$ $\phi = a\tan(dy/dx)$

In the angle φ in the horizontal direction, however, condition classification is must be conducted in the following manner:

$dx>0$: $\phi = a\tan(dy/dx)$ $dx<0, dy>0$: $\phi = a\tan(dy/dx)+180°$ $dx<0, dy<0$: $\phi = a\tan(dy/dx)-180°$ Furthermore, θ' is an angle in the vertical direction with respect to the XY-plane, and obtained as follows:

$\theta' = 90° - \theta$

Therefore, the angles in the horizontal and vertical directions are derived from the angles α and β of the W-axis 22 and the U-axis 24 by using the above relational expressions.

Figures 3, 4:
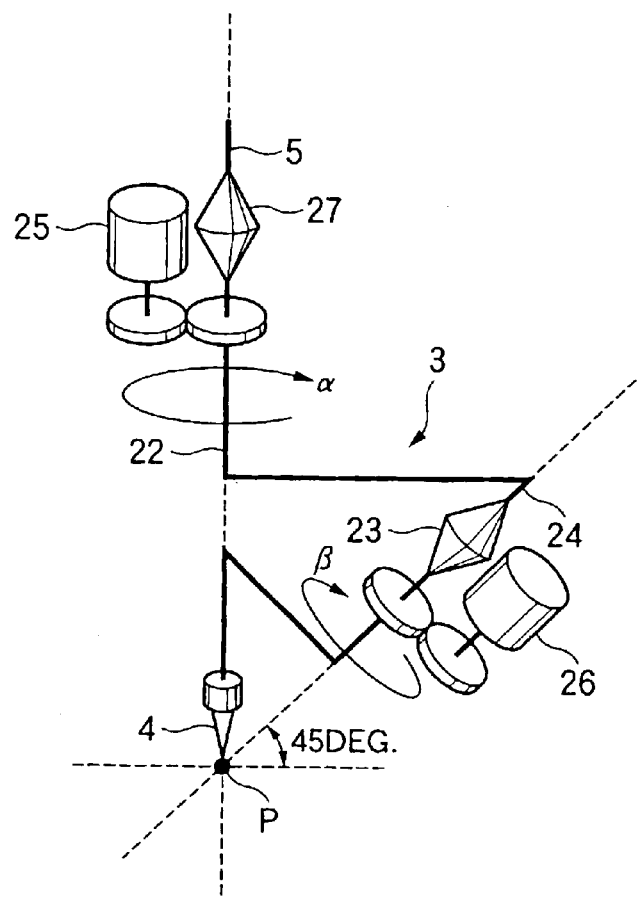
FIG. 3 is a structure diagram showing the structure of a processing head.
FIG. 4 is a view of a coordinate display screen containing nozzle angles according to the invention, and a screen setting view in a first embodiment.

Moreover, the processing head 3 is configured in a similar manner as that of the conventional art. As shown in FIG. 3, the processing head has: a rotation axis (hereinafter, referred to as W-axis) 22 which is attached to the tip end of the Z-axis unit 5, and which can be rotated in a direction of an arrow +α or −α about the Z-axis by a bearing member 27; and an attitude axis (hereinafter, referred to as U-axis) 24 which is attached to the tip end of the W-axis 22 by a bearing member 23, and which can be rotated in a direction of an arrow +β or −β about an axis that is inclined by 45 degrees with respect to the Z-axis. The processing nozzle 4 is attached to the tip end of the U-axis 24.

The W-axis 22 is rotated by a W-axis servo motor 25, and the U-axis 24 is rotated by a U-axis servo motor 26.

The X-axis servo motor, the Y-axis servo motor, and the Z-axis servo motor (not shown), and the W-axis servo motor 25 and the U-axis servo motor 26 are driven by a driving signal from the NC controller 8, and controlled so that, while maintaining the distance of the processing nozzle 4 with respect to the workpiece on the processing table 2 to be constant, the spot of the laser beam follows the processing line in accordance with the teaching data, and the nozzle angle of the processing nozzle 4 is substantially perpendicular (in the direction of the normal line) to the surface of the processing workpiece 9.

FIG. 4 is a view showing the screen of a coordinate display containing a display of nozzle angles.

In the nozzle angles, angles in the horizontal and vertical directions as seen from an orthogonal coordinate system are displayed.

In accordance with the rotation of the W-axis 22 and the U-axis 24, also the display of the nozzle angles is varied by correspondingly conducting the above-mentioned calculation.

In the case where nozzle angles which are to be previously moved are set on the screen of the screen displaying section 8b or the T/B 7, when a button on the control panel 8a or the T/B 7 is pressed, the W-axis 22 and the U-axis 24 are rotated until the nozzle angle comparing and judging section 13 judges that the values calculated by the nozzle angle calculating section 11 coincide with the preset values.

If the nozzle angle comparing and judging section 13 judges that the nozzle angles reach the preset values, the W-axis 22 and the U-axis 24 are stopped, and a mark of # is displayed at the side of the nozzle angle display, by the nozzle angle displaying section 34.

Figure 5:
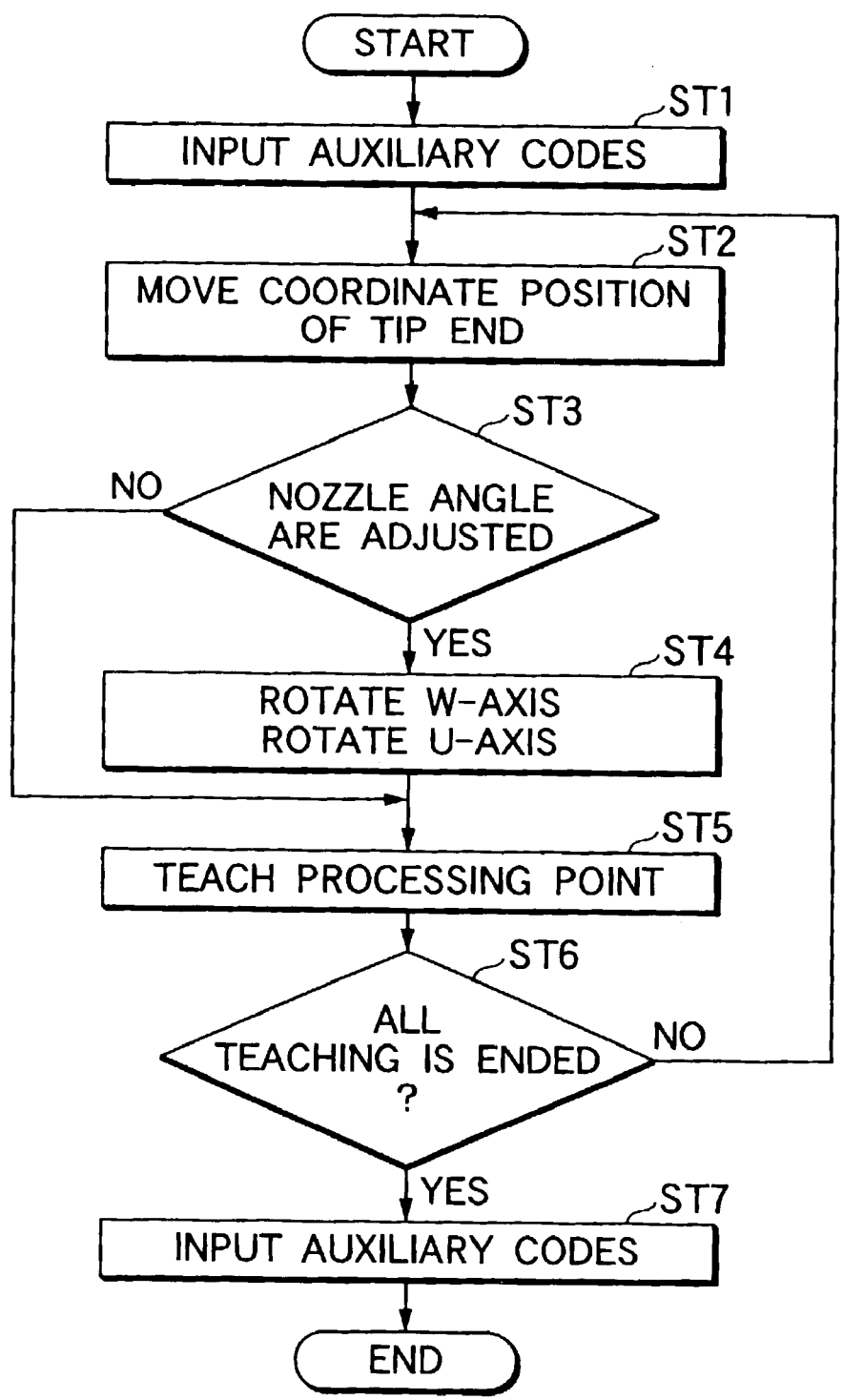
FIG. 5 is a flowchart of a teaching work according to the invention.
Figure 6:
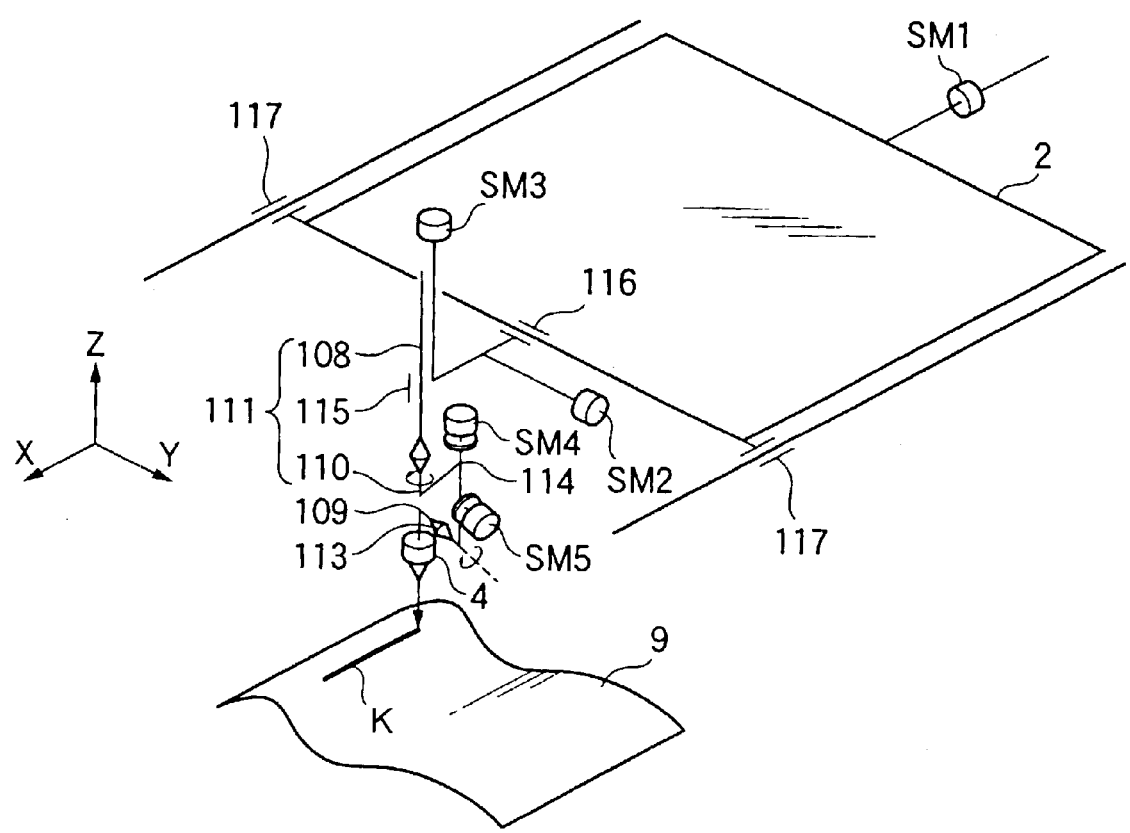
FIG. 6 is a perspective view showing the configurations of axes of a three-dimensional laser beam machine on which a unidirectional head is mounted.
Figure 7A:
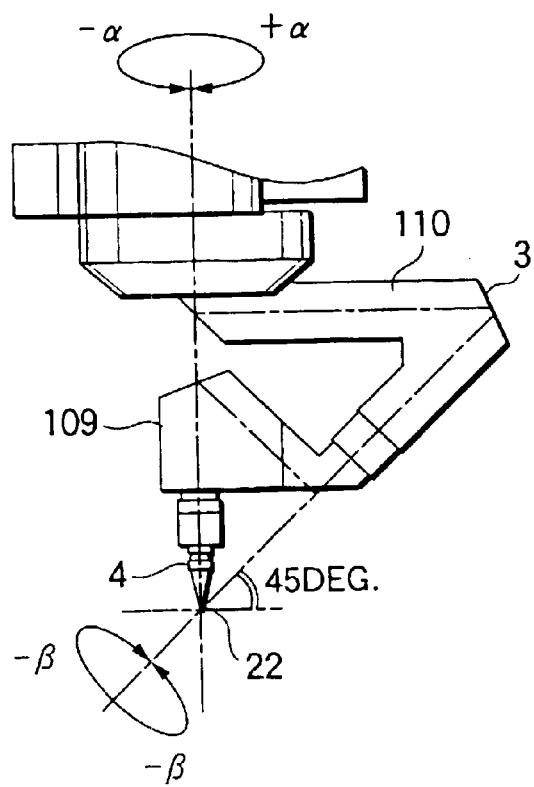
FIGS. 7A and 7B are enlarged views of a processing head of the three-dimensional laser beam machine on which a unidirectional head is mounted.
Figure 7B:
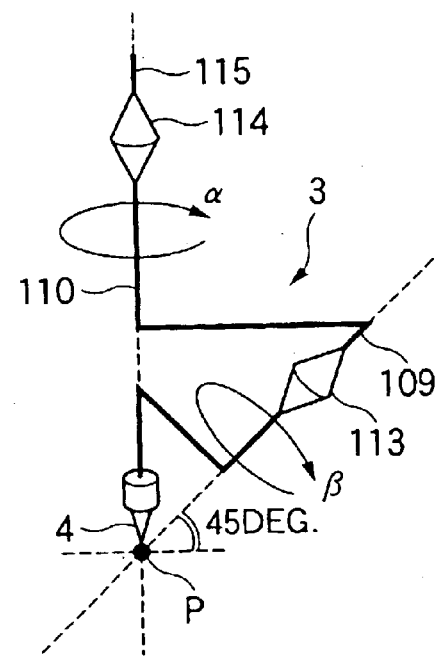
Figure 8:
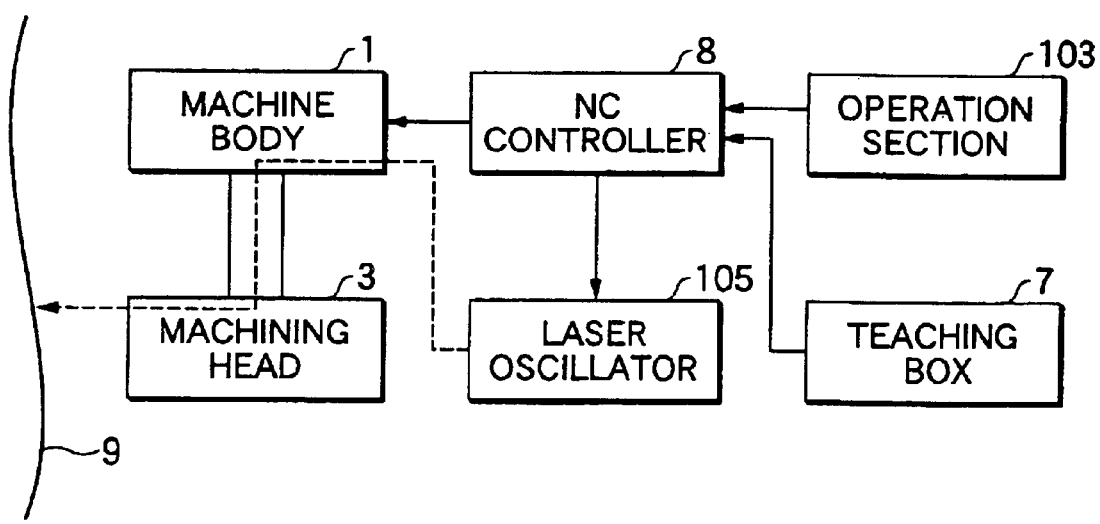
FIG. 8 is a block diagram showing the configuration of the conventional three-dimensional laser beam machine.
Figure 9:
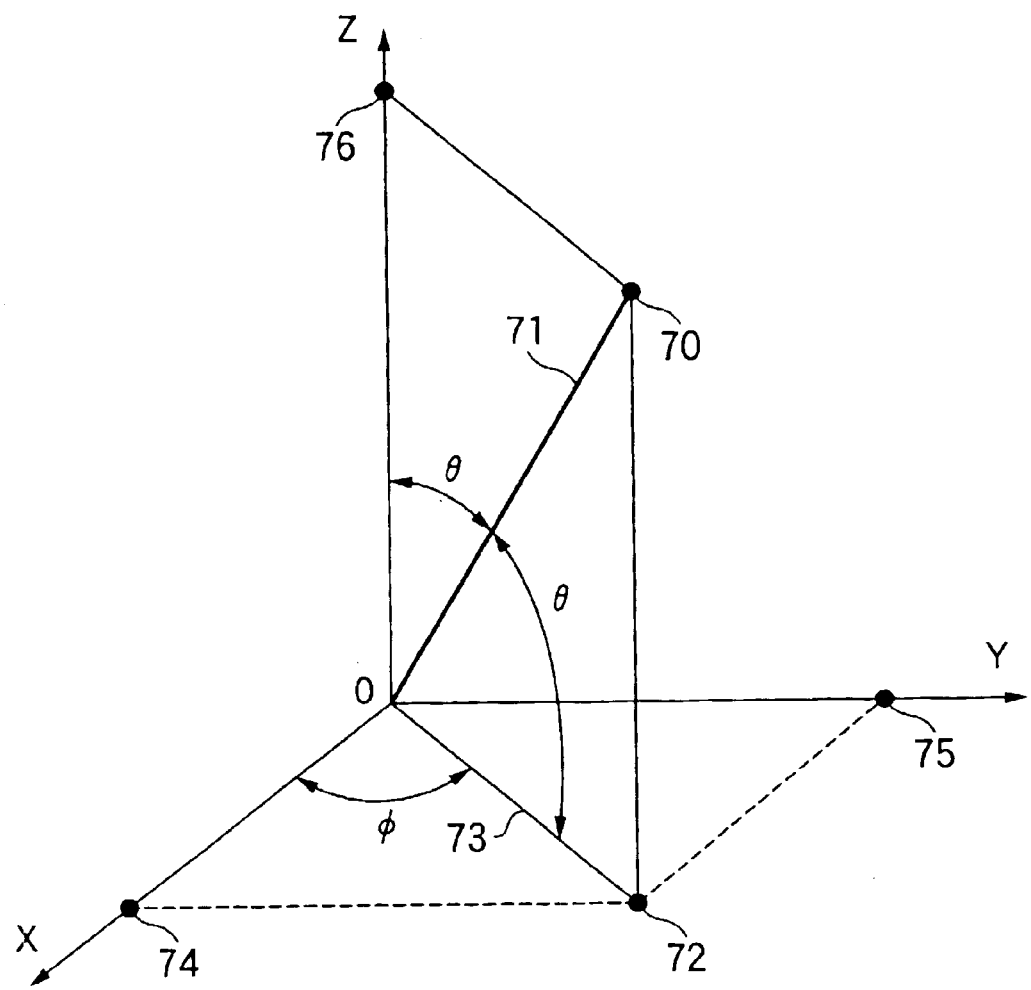
FIG. 9 is a view showing angles of a nozzle in the horizontal and vertical directions as seen from an orthogonal coordinate system.
Figure 10A:
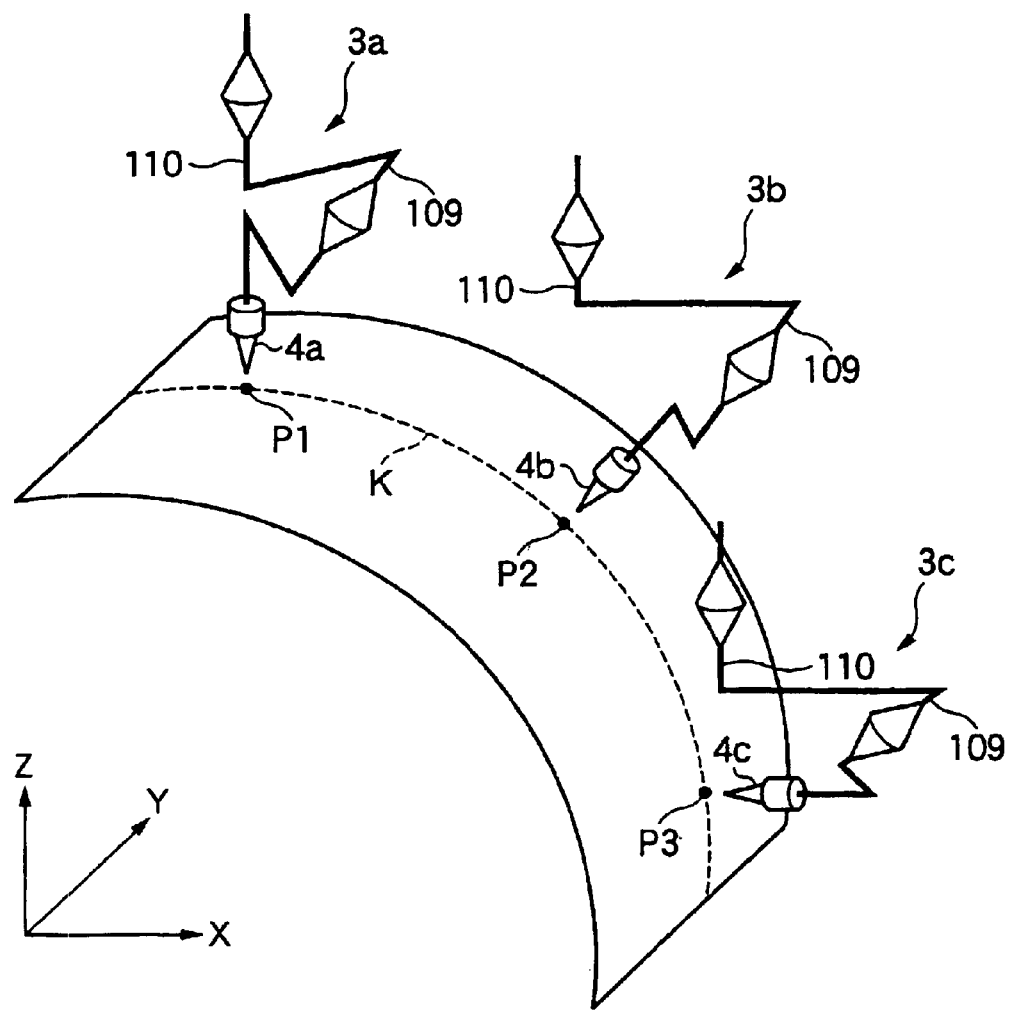
FIGS. 10A and 10B are views schematically showing an attitude change of a processing head and processing.
Figure 10B:
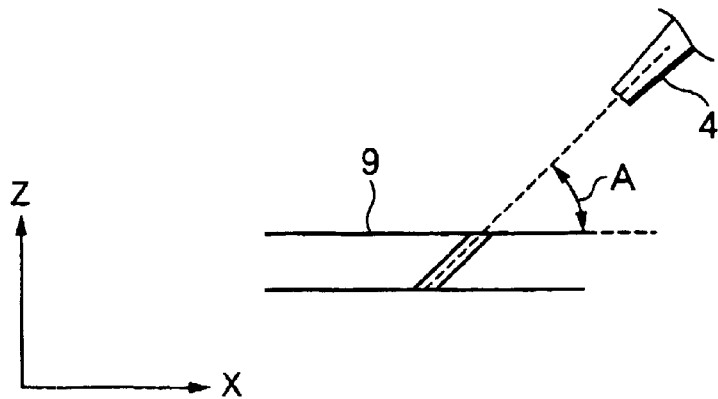
Figure 11:
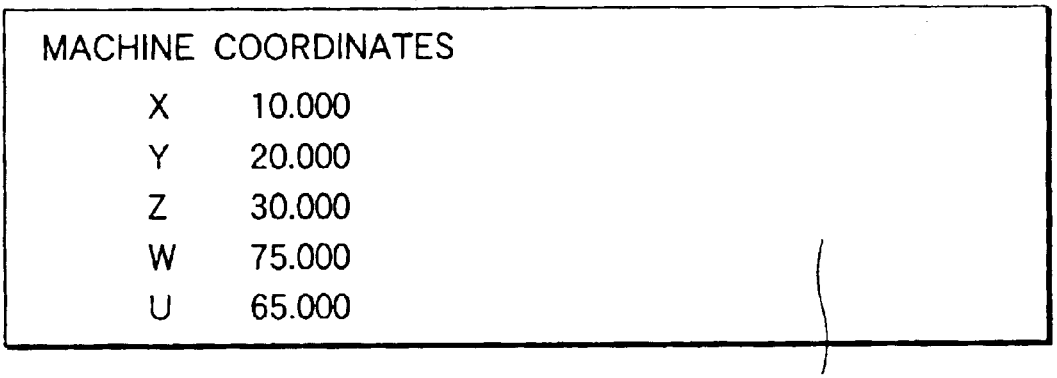
FIG. 11 is a view showing a conventional coordinate display screen.
Figure 12:
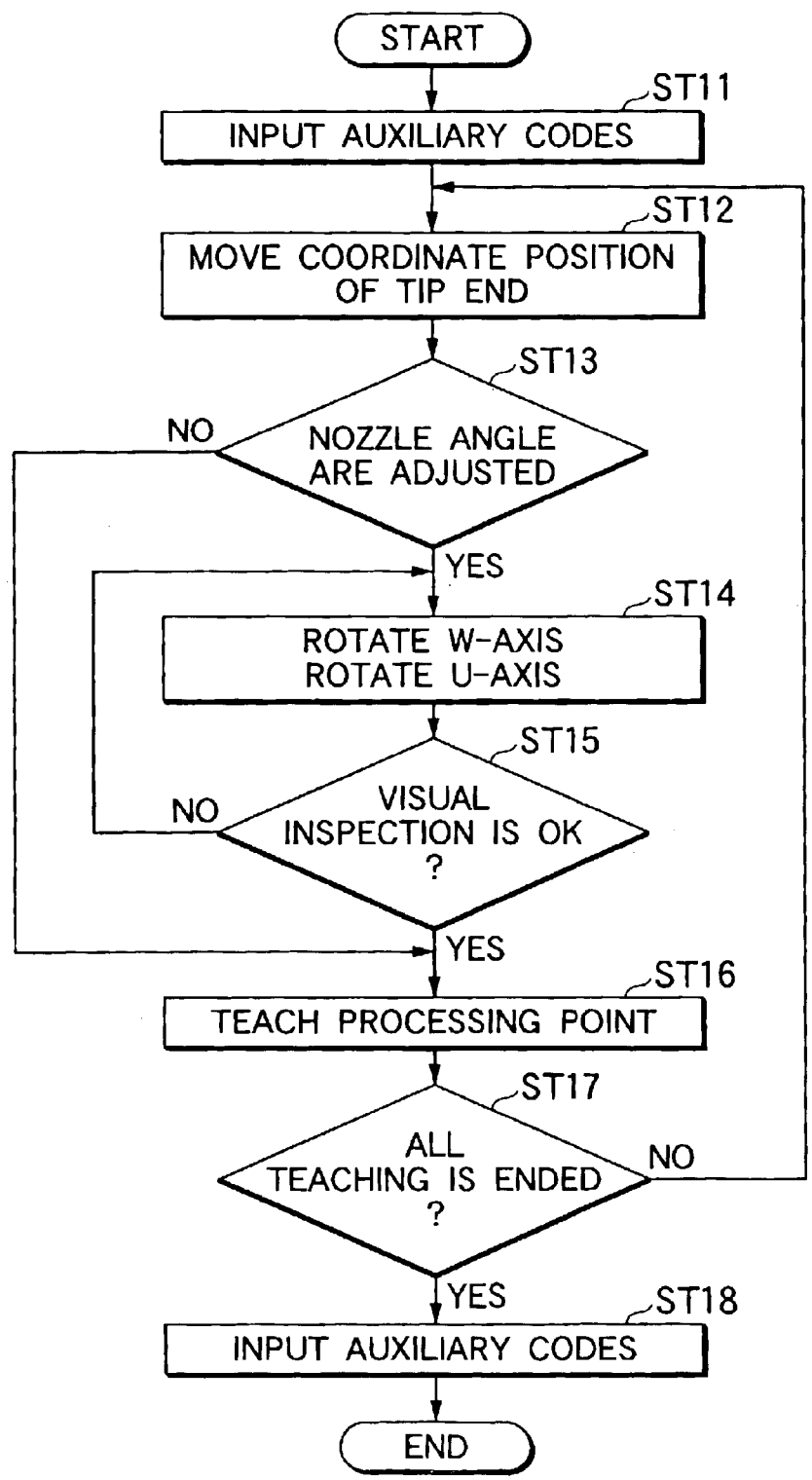
FIG. 12 is a flowchart of a teaching work of a conventional unidirectional head.
Figure 13:
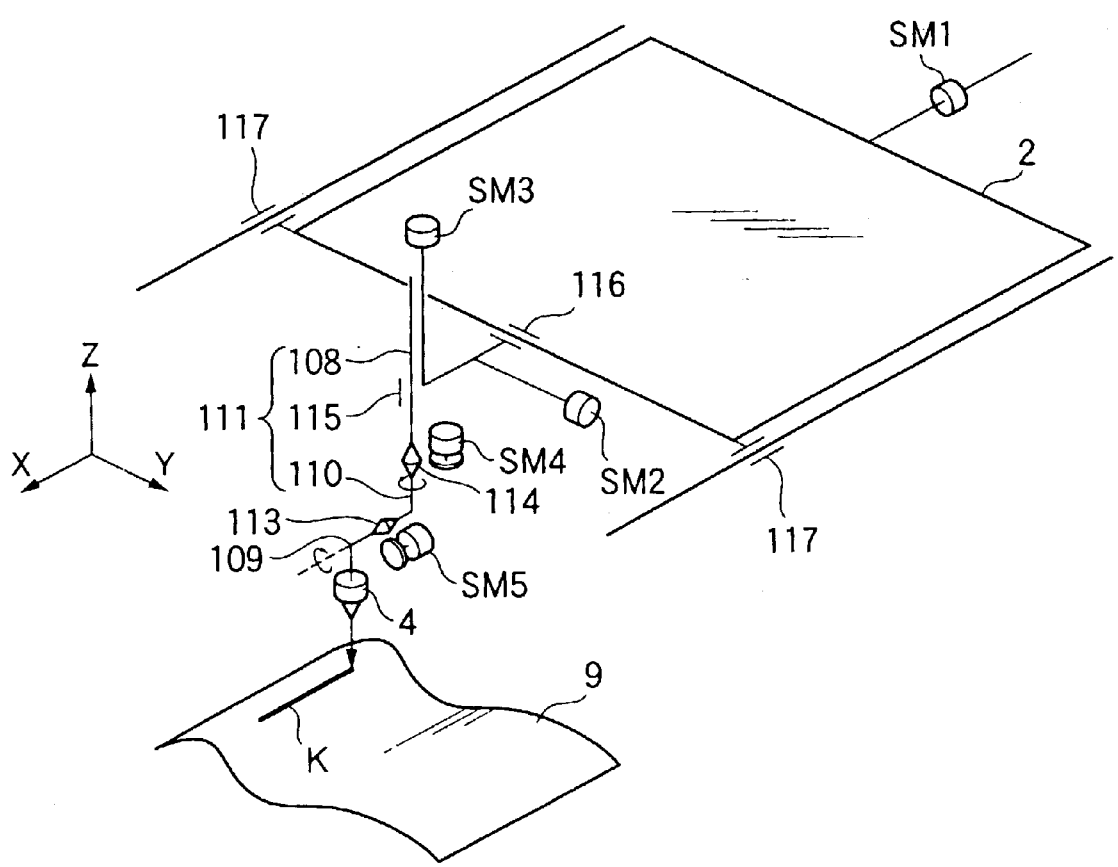
FIG. 13 is a perspective view showing the configurations of axes of a three-dimensional laser beam machine on which an offset type head is mounted.
Figure 14A:
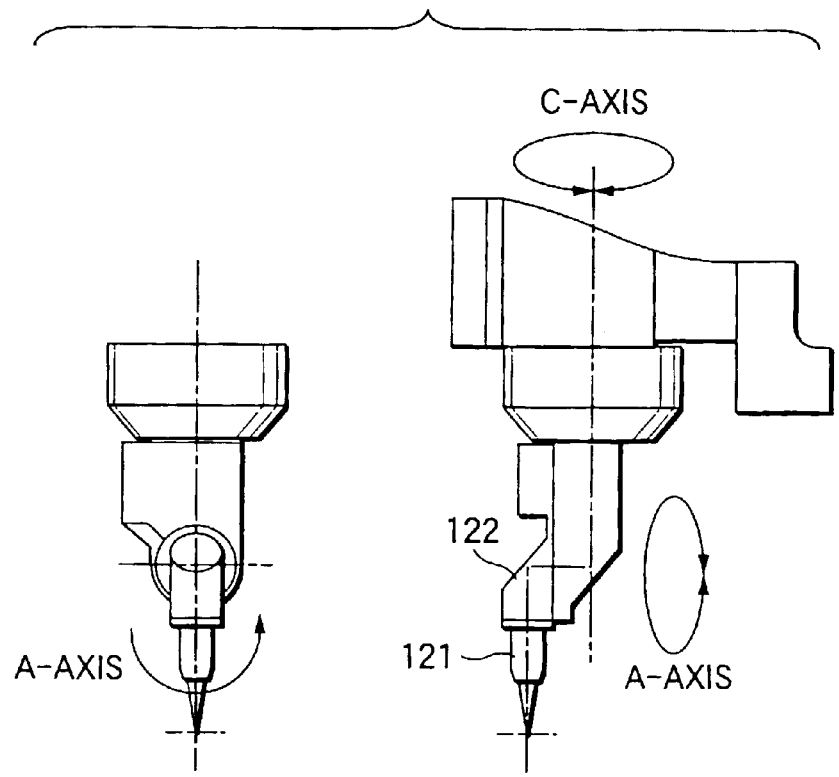
FIGS. 14A and 14B are enlarged views of a processing head of the three-dimensional laser beam machine on which an offset type head is mounted.
Figure 14B:
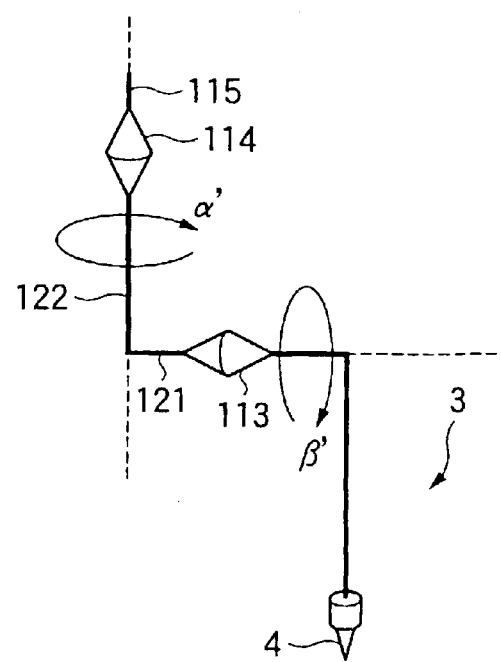
Figure 15:
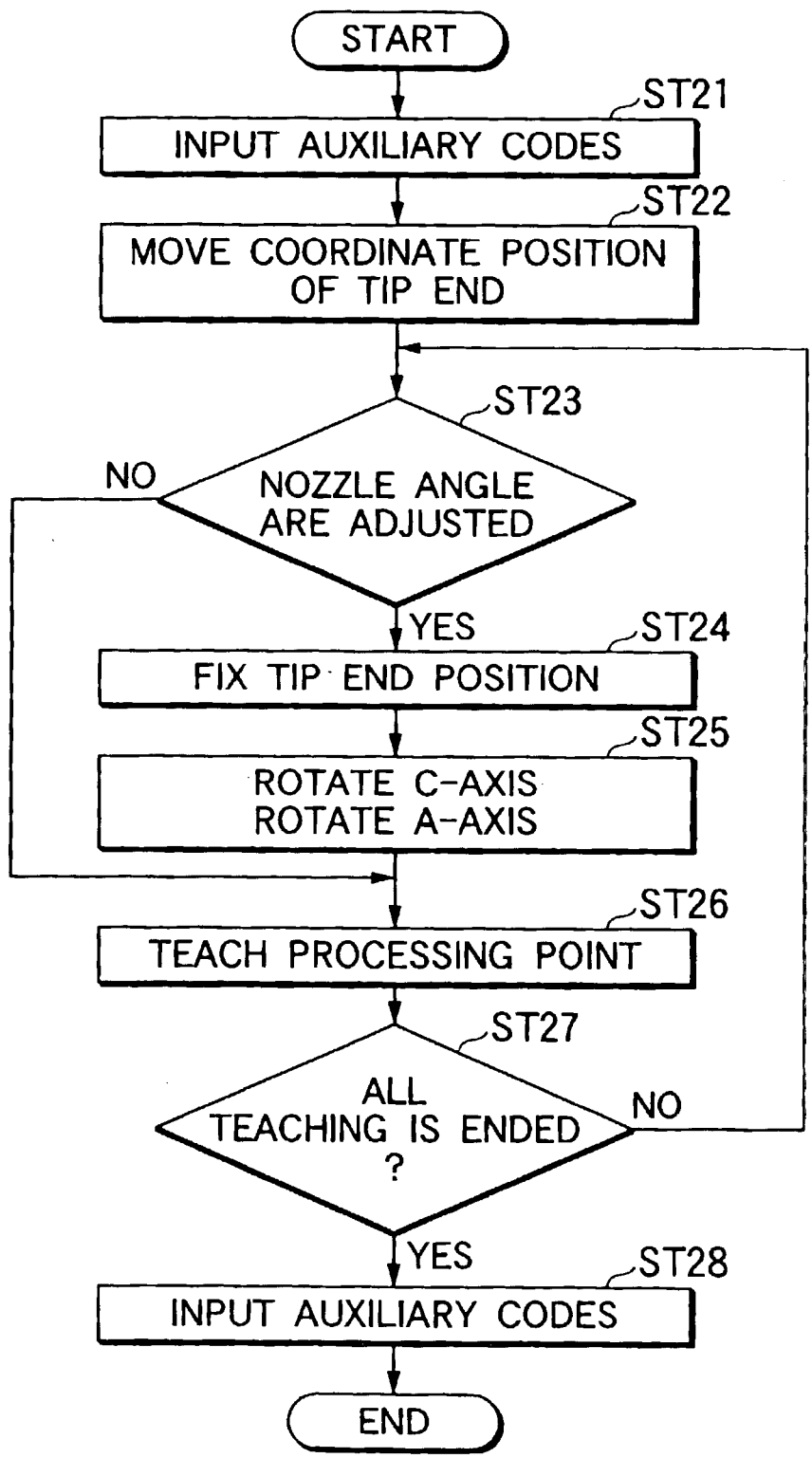
FIG. 15 is a flowchart of a teaching work of an offset type head.

FIG. 5 is a flowchart of a teaching work in an inclined portion of a workpiece or taper processing.

As preparations for a teaching work in which a three-dimensional program is prepared by teaching of processing points, various items such as effectiveness of the use of the T/B 7 are set, and commands such as shutter opening of auxiliary function codes which are default settings in a processing program are then set in step ST1.

While seeing the coordinates of the X-, Y-, and Z-axes on the coordinate display screen shown in FIG. 4, thereafter, the tip end position is moved in step ST2 to a teaching point by using a processing shaft feed key disposed on the T/B 7, or a handle and a joy stick. At this time, if the angles of the processing nozzle 4 must be adjusted by teaching in an inclined portion of a workpiece or taper processing (step ST3), the U-axis 24 and the W-axis 22 are rotated in step ST14 while checking the nozzle angles shown in FIG. 4 and displayed on the T/B 7 or the screen displaying section 8b of the controller 8, until the perpendicular state is realized or the angles in the taper processing are attained.

After the setting of the tip end position and the attitude at the teaching point, teaching is conducted as teaching data in step ST5.

Thereafter, while seeing the coordinate display shown in FIG. 4, the tip end position is similarly moved in step ST6 to the next teaching point by using the processing shaft feed key disposed on the T/B 7, or the handle and the joy stick, and teaching points of the processing program are produced by the teaching work.

In the case of a teaching work in which the nozzle angles are not adjusted in an inclined portion of a workpiece or taper processing, the work of step ST4 is omitted.

Finally, commands such as shutter closing and program end of auxiliary function codes are input in step ST7, and the preparation of the processing program is ended.

According to the embodiment, the nozzle angles can be displayed for a unidirectional head in which the efficiency of a teaching work is low, and hence the perpendicular state with respect to the surface of a workpiece can be easily produced, and the work of repeatedly visually checking the nozzle angles can be omitted, so that the efficiency of the teaching work can be improved.

With respect to a request for taper processing, moreover, angles of taper processing can be matched at a high accuracy.

On the other hand, for the user who previously had a three-dimensional laser beam machine on which an offset type head is mounted, the ease of use is enhanced because a teaching work can be conducted while grasping the nozzle angles, also in a unidirectional head in the same manner as an offset type head.

Furthermore, angle information in the horizontal and vertical directions can be displayed on a remote operating apparatus such as a T/B, and hence the angles of the nozzle in the horizontal and vertical directions can be checked on the spot during a teaching work, whereby the working efficiency can be improved by shortening of the time period.

In the case of an inclined portion of a workpiece or where the nozzle angles are designated in a drawing, the nozzle angles can be made coincident with the actual nozzle angles, and, with respect to a workpiece in which the inclination angle is known, the perpendicular state can be easily attained. Therefore, a teaching work can be conducted more efficiently.

As described above in detail, according to the invention, a perpendicular state of a nozzle with respect to the surface of a workpiece can be easily established, so that the efficiency of a teaching work can be improved.

Since comparison between preset nozzle angles and the actual nozzle angles during a teaching work can be conducted, the working efficiency of the operator can be improved.

Since the angles of the nozzle in the horizontal and vertical directions can be checked on the spot during a teaching work, the working efficiency can be improved by shortening of the time period.

INDUSTRIAL APPLICABILITY

As described above, the three-dimensional laser beam machine of the invention is suitable for displaying the nozzle angles of a processing head to improve the efficiency of a teaching work.

What is claimed is:

1. A three-dimensional laser beam machine having a head structure in which a processing point is not moved when a rotation axis and an attitude axis are rotated, wherein said machine comprises:

means for storing information of current angles of said rotation axis and said attitude axis, and calculating a nozzle direction vector from the angles;

means for, based on the nozzle direction vector, determining angles of a nozzle in a vertical direction and a horizontal direction consisting of a Z-axis of an orthogonal coordinate system; and means for displaying the determined nozzle angles.

2. A three-dimensional laser beam machine according to claim 1, wherein determination of the angles of said nozzle in the vertical direction and the horizontal direction is obtained on the basis of the nozzle direction vector from the angle of said nozzle in the vertical direction consisting of the Z-axis of the orthogonal coordinate system, and an angle in the horizontal direction consisting of an X-axis when the nozzle direction vector is projected onto an XY-plane.

3. A three-dimensional laser beam machine according to claim 1 or 2, wherein said machine further comprises nozzle angle setting means for previously storing angles of said nozzle, and comprises notifying means for comparing with the determined angles of said nozzle in the vertical direction and the horizontal direction, to notify that the previously stored nozzle angles are attained.

4. A three-dimensional laser beam machine according to any one of claims 1 to 3, wherein the nozzle angles are displayed on a remote operation section such as a teaching box.

5. A three-dimensional laser beam machine according to any one of claims 1 to 3, wherein said machine further comprises nozzle angle setting means for previously storing angles of said nozzle, and compares with the determined angles of the nozzle in the vertical direction and the horizontal direction, whereby the rotation axis and the attitude axis of said nozzle are rotated and said nozzle is positioned to the previously stored nozzle angles.

6. A three-dimensional laser beam machine according to claim 4, wherein said machine further comprises nozzle angle setting means for previously storing angles of said nozzle, and compares with the determined angles of the nozzle in the vertical direction and the horizontal direction, whereby the rotation axis and the attitude axis of said nozzle are rotated and said nozzle is positioned to the previously stored nozzle angles.

* * * * *